United States Patent
Yang et al.

(10) Patent No.: US 10,477,578 B2
(45) Date of Patent: Nov. 12, 2019

(54) UPLINK DATA TRANSMISSION METHOD AND USER EQUIPMENT, AND UPLINK DATA RECEPTION METHOD AND BASE STATION

(71) Applicant: LG ELECTRONICS INC., Seoul (KR)

(72) Inventors: Suckchel Yang, Seoul (KR); Joonkui Ahn, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/560,844

(22) PCT Filed: Mar. 24, 2016

(86) PCT No.: PCT/KR2016/002995
§ 371 (c)(1),
(2) Date: Sep. 22, 2017

(87) PCT Pub. No.: WO2016/153290
PCT Pub. Date: Sep. 29, 2016

(65) Prior Publication Data
US 2018/0115991 A1   Apr. 26, 2018

Related U.S. Application Data

(60) Provisional application No. 62/137,786, filed on Mar. 24, 2015, provisional application No. 62/180,044, filed on Jun. 15, 2015.

(51) Int. Cl.
*H04W 16/14* (2009.01)
*H04W 72/14* (2009.01)
(Continued)

(52) U.S. Cl.
CPC ....... *H04W 74/0808* (2013.01); *H04W 16/14* (2013.01); *H04W 72/14* (2013.01); *H04W 72/1268* (2013.01)

(58) Field of Classification Search
CPC ... H04L 5/001; H04L 5/0094; H04W 72/1289
See application file for complete search history.

(56) References Cited

U.S. PATENT DOCUMENTS

| 2014/0362780 | A1 | 12/2014 | Malladi et al. | |
| 2015/0049715 | A1* | 2/2015 | Yerramalli | H04L 5/1469 370/329 |
| 2018/0175975 | A1* | 6/2018 | Um | H04L 1/1816 |

OTHER PUBLICATIONS

CATT, "Data and Control Signaling Transmission for LAA," 3GPP TSG RAN WG1 Meeting #80, R1-150113, Athens, Greece, Feb. 9-13, 2015, pp. 1-3.

(Continued)

*Primary Examiner* — Chandrahas B Patel
(74) *Attorney, Agent, or Firm* — Birch, Stewart, Kolasch & Birch, LLP

(57) ABSTRACT

The present invention provides a method and device for transmitting an uplink signal in a cell configured in an unlicensed band. A user equipment performs clear carrier assessment (CCA) on a second cell configured in an unlicensed band, and when the CCA is successful, transmits a known signal notifying that the CCA is successful, on the second cell. A base station transmits, to the user equipment, uplink grant for the second cell only when detecting the known signal on the second cell.

11 Claims, 10 Drawing Sheets

(51) Int. Cl.
  *H04W 74/08* (2009.01)
  *H04W 72/12* (2009.01)

(56) References Cited

OTHER PUBLICATIONS

Samsung, "Discussion on UL Transmission for LAA," 3GPP TSG RAN WG1 #80, R1-150368, Athens, Greece, Feb. 9-13, 2015, pp. 1-7.
ZTE, "Analysis on Potential Issues and Solutions for LAA UL Transmission," 3GPP TSG RAN WG1 Meeting #80, R1-150156, Athens, Greece, Feb. 9-13, 2015, pp. 1-6.

* cited by examiner

FIG. 8
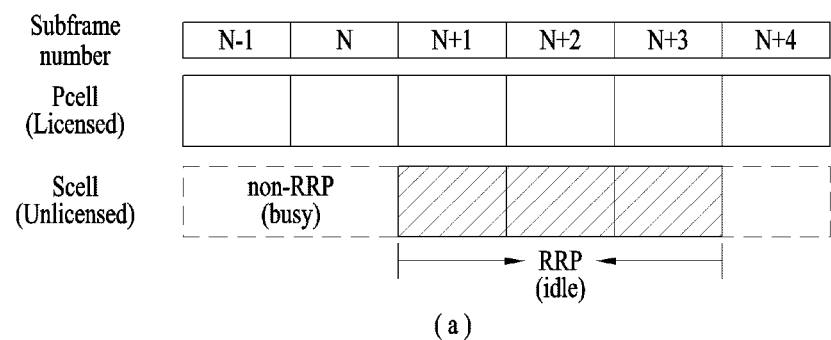
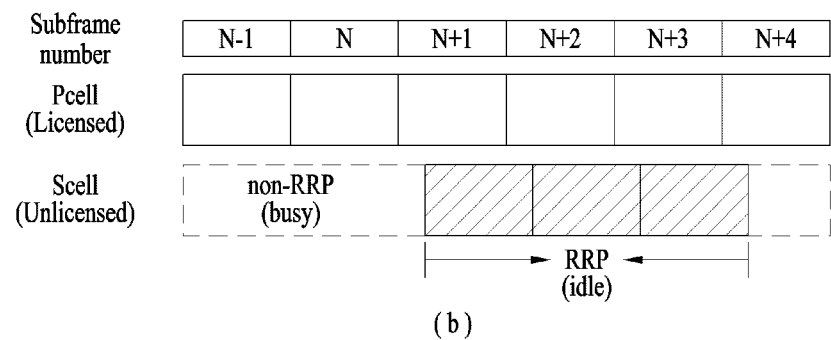

UPLINK DATA TRANSMISSION METHOD AND USER EQUIPMENT, AND UPLINK DATA RECEPTION METHOD AND BASE STATION

CROSS REFERENCE TO RELATED APPLICATIONS

This application is the National Phase of PCT International Application No. PCT/KR2016/002995, filed on Mar. 24, 2016, which claims priority under 35 U.S.C. 119(e) to U.S. Provisional Application No. 62/137,786, filed on Mar. 24, 2015 and No. 62/180,044, filed on Jun. 15, 2015, all of which are hereby expressly incorporated by reference into the present application.

TECHNICAL FIELD

The present invention relates to a wireless communication system and, more particularly, to a method of transmitting or receiving uplink data and an apparatus therefor.

BACKGROUND ART

With appearance and spread of machine-to-machine (M2M) communication and a variety of devices such as smartphones and tablet PCs and technologies demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted within limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

Meanwhile, a communication environment evolves into an environment that density of a node that may be accessed by a UE is increased. The node means a fixed point that includes one or more antennas to transmit/receive radio signals to and from a UE. A communication system provided with a node of high density may provide the UE with a communication service of higher throughput through cooperation between nodes.

DISCLOSURE

Technical Problem

Due to the introduction of new radio communication technology, the number of user equipments (UEs) to which a BS should provide a service in a predetermined resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

In addition, a method of simultaneously transmitting more signals by aggregating carriers used by different systems is demanded.

The technical objects that can be achieved through the present invention are not limited to what has been particularly described hereinabove and other technical objects not described herein will be more clearly understood by persons skilled in the art from the following detailed description.

Technical Solutions

A method of transmitting uplink data by a user equipment (UE), the method comprising: performing clear carrier assessment (CCA) for a second cell configured in an unlicensed band; transmitting a first occupation signal through the second cell during a first predetermined time duration, when the performing of the CCA for the second cell is success; attempting to detect an uplink grant for the second cell, which is a response signal for the first occupation signal, on a first cell configured in a licensed band during the first predetermined time duration; an transmitting the uplink data through the second cell according to the uplink grant for the second cell, when detecting the uplink grant for the second cell on the first cell.

Additionally or alternatively, the method further comprising: receiving configuration information for the CCA for the second cell through the first cell; and performing the CCA for the second cell according to the configuration information.

Additionally or alternatively, the transmitting the uplink data includes transmitting the uplink data after a second predetermined time duration from a time at which the uplink grant for the second cell is detected.

Additionally or alternatively, the method further comprising transmitting a second occupation signal during the second predetermined time duration.

Additionally or alternatively, the method further comprising waiting until a next CCA timing when failing to perform the CCA for the second cell or detect the uplink grant for the second cell.

A method of receiving uplink data by a base station (BS) from a user equipment (UE), comprising: receiving a first occupation signal, indicating that clear carrier assessment (CCA) for a second cell by the UE is successful, from the UE through the second cell configured in an unlicensed band within a first predetermined time duration; transmitting an uplink grant for the second cell, which is a response signal for the first occupation signal, to the UE on a first cell configured in a licensed band within the first preconfigured time duration; and attempting to receive the uplink data on the second cell according to the uplink grant for the second cell.

Additionally or alternatively, the method further comprising transmitting configuration information for the CCA for the second cell through the first cell.

Additionally or alternatively, wherein the receiving the uplink data includes attempting to receive the uplink data for a second preconfigured time duration after transmitting the uplink grant for the second cell.

A user equipment (UE) for transmitting uplink data, the UE comprising: a radio frequency (RF) unit; and a processor configured to control the RF unit, wherein the processor is configured to perform clear carrier assessment (CCA) for a second cell configured in an unlicensed band, control the RF unit to transmit a first occupation signal through the second cell during a first predetermined time duration, when the performing of the CCA for the second cell is success, attempt to detect an uplink grant for the second cell, which is a response signal for the first occupation signal, on a first cell configured in a licensed band during the first predetermined time duration, and control the RF unit to transmit the uplink data through the second cell according to the uplink grant for the second cell, when detecting the uplink grant for the second cell on the first cell.

Additionally or alternatively, the processor is configured to: control the RF unit to receive configuration information for the CCA for the second cell through the first cell; and perform the CCA for the second cell according to the configuration information.

Additionally or alternatively, the uplink data is transmitted after a second predetermined time duration from a time at which the uplink grant for the second cell is detected.

Additionally or alternatively, a second occupation signal is transmitted during the second predetermined time duration.

Additionally or alternatively, the processor is configured to wait until a next CCA timing when failing to perform the CCA for the second cell or detect the uplink grant for the second cell.

A base station (BS) for receiving uplink data from a user equipment (UE), comprising: a radio frequency (RF) unit; and a processor configured to control the RF unit, wherein the processor is configured to control the RF unit to receive a first occupation signal, indicating that clear carrier assessment (CCA) for a second cell by the UE is successful, from the UE through the second cell configured in an unlicensed band within a first predetermine time duration, control the RF unit to transmit an uplink grant for the second cell, which is a response signal for the first occupation signal, to the UE on a first cell configured in a licensed band within the first preconfigured time duration, and control the RF unit to attempt to receive the uplink data on the second cell according to the uplink grant for the second cell.

Additionally or alternatively, the processor is configured to control the RF unit to transmit configuration information for the CCA for the second cell through the first cell.

Advantageous Effects

According to an embodiment of the present invention, a wireless communication signal can be efficiently transmitted/received. As a result, the overall throughput of the wireless communication system can be increased.

According to an embodiment of the present invention, a new carrier which is not dedicated to a legacy system while maintaining compatibility with the legacy system can be aggregated with a carrier of the legacy system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 illustrates a subframe configuration of a reserved resource period (RRP).

BEST MODE FOR CARRYING OUT THE INVENTION

Figure 1:
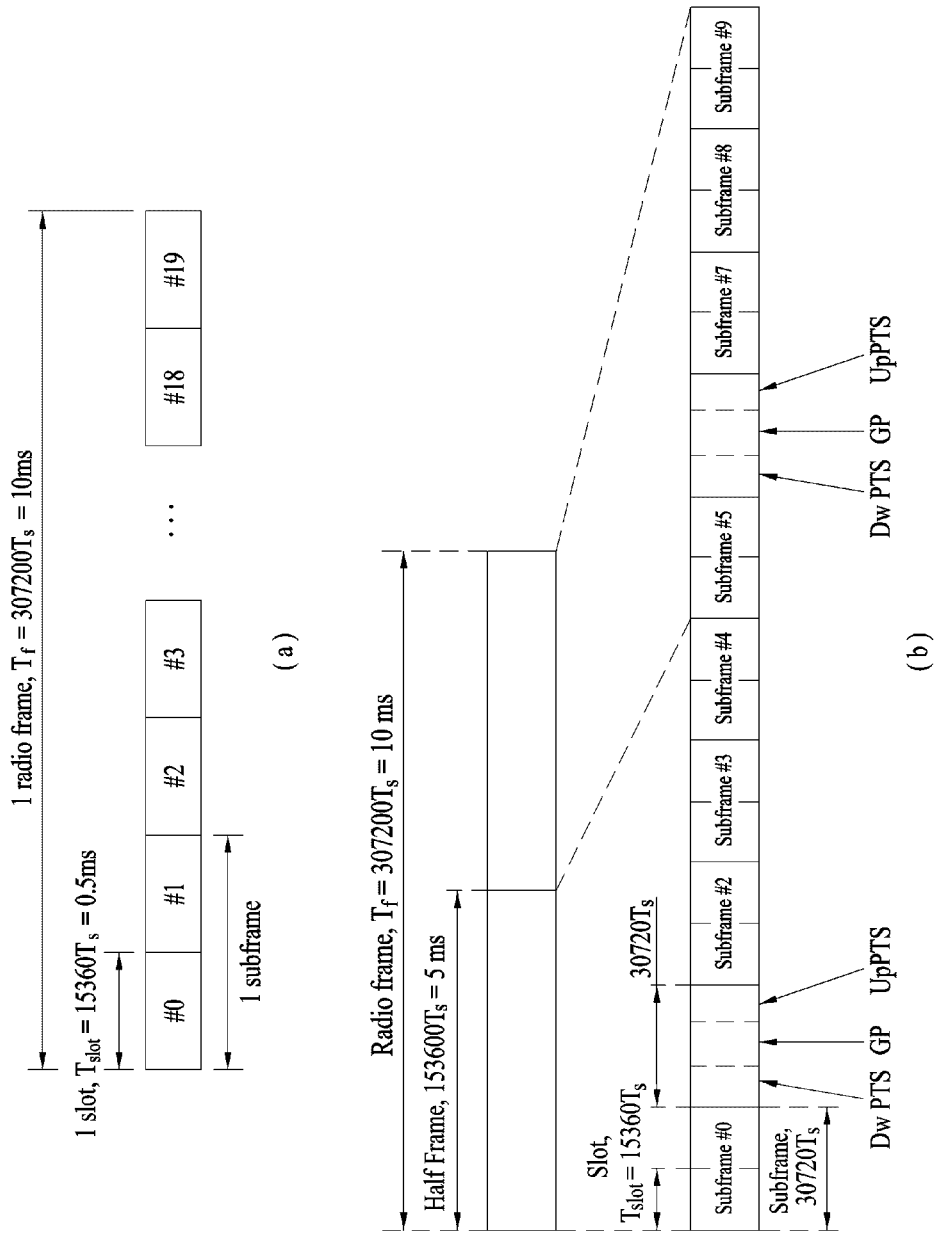
FIG. 1 is diagram illustrating an example of a radio frame structure used in a wireless communication system.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE) (that is, GERAN). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunication system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmission device determines whether another transmission is being performed before attempting to transmit traffic to a reception device. In other words, the transmission device attempts to detect the presence of a carrier from another transmission device before attempting to perform transmission. Upon sensing the carrier, the transmission device waits for another transmission device which is performing transmission to finish transmission, before initiating transmission thereof. Consequently, CSMA can be a communication scheme based on the principle of "sense before transmit" or "listen before talk". A scheme for avoiding collision between transmission devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission, and CSMA/CD is a scheme for flexibly transmitting data by monitoring collision. A transmission device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In the LTE/LTE-A based system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will later be described in detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH resource, respectively. Hereinafter, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe, and a subframe in which a synchronization signal (e.g., PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the terms CRS/UE-RS/CSI-RS/TRS ports may also be used to indicate a pattern of REs occupied by CRSs/UE-RSs/CSI-RSs/TRSs in a predetermined resource region.

FIG. 1 illustrates an example of a radio frame structure used in a wireless communication system.

Specifically, FIG. 1(a) illustrates an exemplary structure of a radio frame for frequency division multiplexing (FDD) used in a 3GPP LTE/LTE-A system, and FIG. 1(b) illustrates an exemplary structure of a radio frame for time division multiplexing (TDD) used in a 3GPP LTE/LTE-A system.

Referring to FIG. 1, the radio framed used in a 3GPP LTE/LTE-A system is 10 ms (307200 Ts) in duration. The radio frame is divided into 10 subframes (SFs) of equal size. Subframe numbers may be assigned to the 10 subframes within one radio frame, respectively. In this case, Ts denotes sampling time and is represented by Ts=1/(2048*15 kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may be configured differently depending on duplex modes. In FDD mode for example, since DL transmission and UL transmission are discriminated according to frequency, a radio frame for a specific frequency band includes either DL subframes or UL subframes. In TDD mode, since DL transmission and UL transmission are discriminated according to time, a radio frame for a specific frequency band includes both DL subframes and UL subframes.

Table 1 shows an exemplary UL-DL configuration of subframes within a radio frame in TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). The DwPTS is a time slot reserved for DL transmission and the UpPTS is a time slot reserved for UL transmission. Table 2 shows an example of the special subframe configuration.

Figure 2:
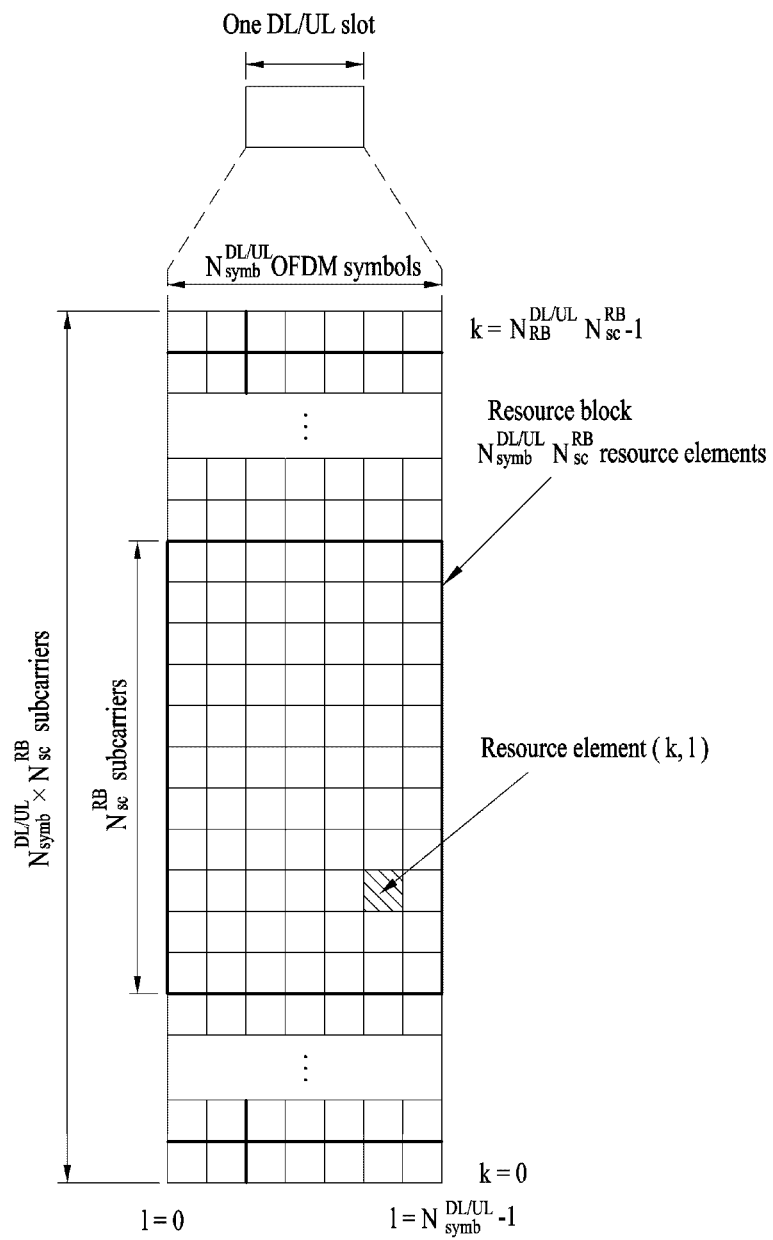
FIG. 2 is diagram illustrating an example of a downlink/uplink (DL/UL) slot structure in a wireless communication system.

FIG. 2 is a diagram illustrating a resource grid of a DL slot.

Although FIG. 2 illustrates that one DL slot includes 7 OFDM symbols in a time domain and one resource block (RB) includes 12 subcarriers in a frequency domain, the present invention is not limited to the example of FIG. 2. For example, in case of normal cyclic prefix (CP), one slot includes 7 OFDM symbols, however, in case of extended CP, one slot may include 6 OFDM symbols. One resource block (RB) includes 12×7 resource elements (REs). The number NDL of RBs included in the downlink slot depends on a downlink transmit bandwidth. The structure of a UL slot may be the same as that of the DL slot.

Figure 3:
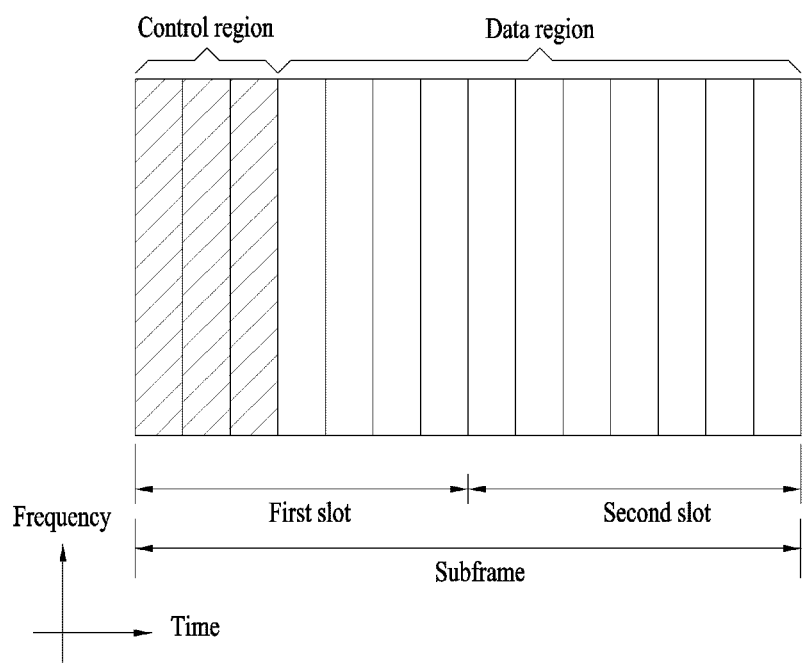
FIG. 3 is diagram illustrating an example of a downlink (DL) subframe structure used in a wireless communication system.

FIG. 3 illustrates a structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe correspond to the control region to which a control channel is allocated. Hereinafter, a resource region available for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols used for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) is referred to as DL scheduling information or DL grant. Transmit format and resource allocation information of an uplink shared channel (UL-SCH) is referred to as UL scheduling information or UL grant. The size and usage of the DCI carried by one PDCCH are varied

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS ee | Normal cyclic prefix in uplink | Extended cyclic prefix in uplink |
| 0 | 6592 · Ts | 2192 · Ts | 2560 · Ts | 7680 · Ts | 2192 · Ts | 2560 · Ts |
| 1 | 19760 · Ts | | | 20480 · Ts | | |
| 2 | 21952 · Ts | | | 23040 · Ts | | |
| 3 | 24144 · Ts | | | 25600 · Ts | | |
| 4 | 26336 · Ts | | | 7680 · Ts | 4384 · Ts | 5120 · Ts |
| 5 | 6592 · Ts | 4384 · Ts | 5120 · Ts | 20480 · Ts | | |
| 6 | 19760 · Ts | | | 23040 · Ts | | |
| 7 | 21952 · Ts | | | — | — | — |
| 8 | 24144 · Ts | | | — | — | — | depending on DCI formats. The size of the DCI may be varied depending on a coding rate. In the current 3 GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), and precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). A DCI format and the number of DCI bits are determined depending on the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

If RRH technology, cross-carrier scheduling technology, etc. are introduced, the amount of PDCCH which should be transmitted by the eNB is gradually increased. However, since a size of a control region to which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH). The EPDCCH may be configured for rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH may be transmitted based on the demodulation RS (hereinafter, DMRS). Accordingly, the UE may decode/demodulate the PDCCH based on the CRS and decode/demodulate the EPDCCH based on the DMRS. The DMRS associated with the EPDCCH is transmitted on the same antenna port $p \in \{107,108,109,110\}$ as the EPDCCH physical resource, is present for EPDCCH demodulation only if the EPDCCH is associated with the corresponding antenna port, and is transmitted only on the PRB(s) to which the EPDCCH is mapped.

Even in case of the DMRS for demodulation of the EPDCCH in the same manner as the UE-RS for demodulation of the PDSCH, if the type of the EPDCCH and the number of layers are equally applied to the DMRS, a certain number of REs per RB pair are used for DMRS transmission regardless of the UE or cell. Hereinafter, except for a case specific to the EPDCCH, the PDCCH and the EPDCCH will be referred to as PDCCH. The present invention may be applied to EPDCCH, PUSCH, and PDSCH and/or PUSCH scheduled by the EPDCCH as well as PDCCH, PUCCH, and PDSCH and/or PUSCH scheduled by the PDCCH.

In the 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs. The SSs may have different sizes, and a dedicated SS and a common SS are defined. The dedicated SS is a UE-specific SS (USS) and is configured for each individual UE. The common SS (CSS) is configured for a plurality of UEs.

The eNB transmits an actual PDCCH (DCI) on a PDCCH candidate in a search space and the UE monitors the search space to detect the PDCCH (DCI). In this case, monitoring means attempting to decode each PDCCH in the corresponding SS in accordance with all monitored DCI formats. The UE may detect its PDCCH by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected. This process is referred to as blind detection (or blind decoding (BD)).

For example, it is assumed that a specific PDCCH is CRC-masked with a radio network temporary identity (RNTI) 'A' and information about data transmitted using a radio resource 'B' (e.g., frequency location) and using transport format information 'C' (e.g., transport block size, modulation scheme, coding information, etc.) is transmitted through a specific DL subframe. Then, the UE monitors the PDCCH using RNTI information thereof. The UE having the RNTI 'A' detects the PDCCH and receives the PDSCH indicated by 'B' and 'C' through information of the received PDCCH.

Generally, a DCI format which may be transmitted to the UE is varied depending on a transmission mode (TM) configured for the UE. In other words, for the UE configured for a specific transmission mode, not all DCI formats but some DCI format(s) corresponding to the specific transmission mode can be used. For example, the UE is semi-statically configured by higher layers so as to receive PDSCH data transmission, which is signaled through the PDCCH, in accordance with one of a plurality of transmission modes previously defined. To maintain operation load of the UE according to blind decoding attempt at a predetermined level or less, not all DCI formats are always simultaneously searched by the UE.

Meanwhile, a PDCCH may be additionally allocated within a data region (e.g., a resource region for a PDSCH). The PDCCH allocated to the data region is referred to as an enhanced PDCCH (EPDCCH). As illustrated, scheduling restriction caused by a limited control channel resource of a PDCCH region may be relieved by additionally securing the control channel resource through the EPDCCH. Like the PDCCH, the EPDCCH carries DCI. For example, the EPDCCH may carry DL scheduling information and UL scheduling information. The UE may receive the EPDCCH and receive data/control information through a PDSCH corresponding to the EPDCCH. In addition, the UE may receive the EPDCCH and transmit data/control information through a PUSCH corresponding to the EPDCCH. The EPDCCH/PDSCH may be allocated starting from the first OFDM symbol of a subframe according to cell type. Unless particularly distinguished otherwise, the PDCCH includes both the PDCCH and the EPDCCH in the present specification.

Figure 4:
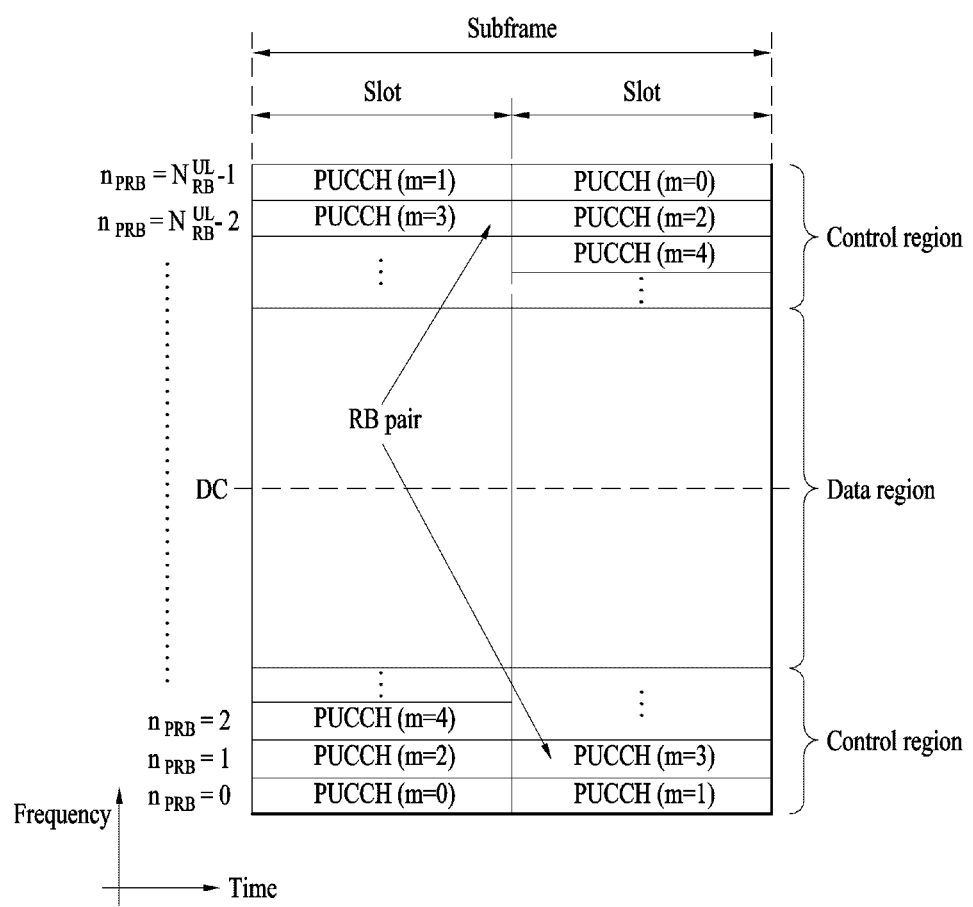
FIG. 4 is diagram illustrating an example of an uplink (UL) subframe structure used in a wireless communication system.

FIG. 4 illustrates an example of a structure of a UL subframe used in a wireless communication system.

Referring to FIG. 4, a UL subframe may be divided into a control region and a data region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission bandwidth are allocated to transmit UCI. A DC subcarrier is a component unused for signal transmission and is mapped to a carrier frequency f0 in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g., codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

Figure 5:
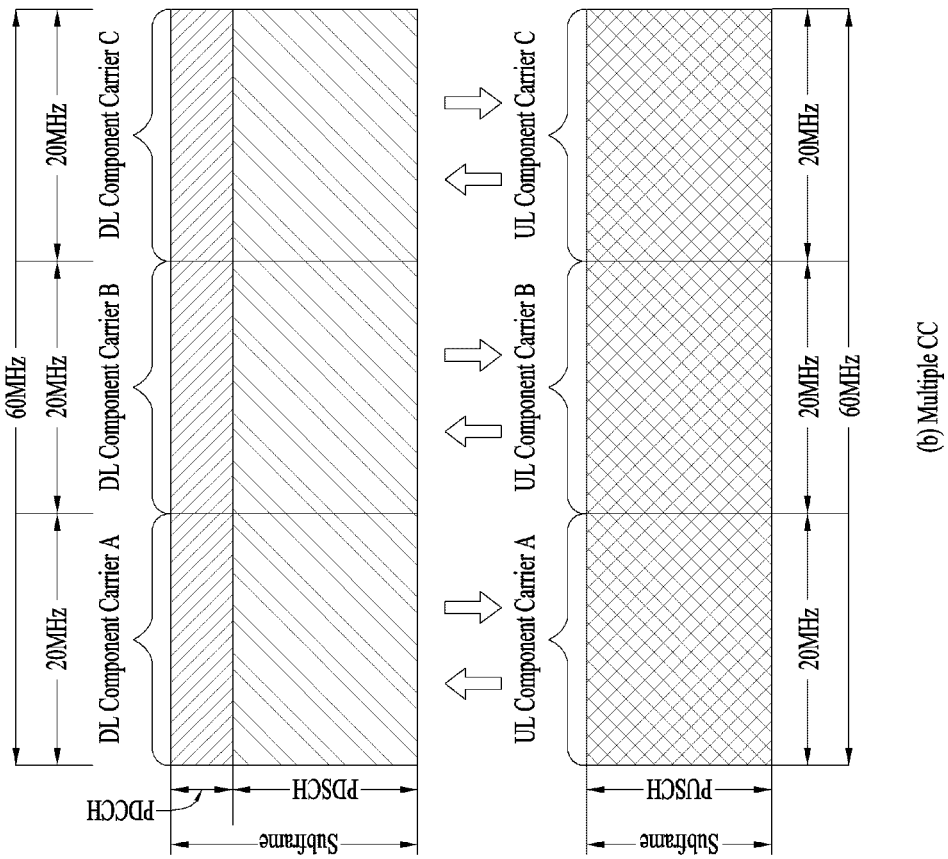
FIG. 5 is a diagram illustrating single carrier communication and multi-carrier communication.

FIG. 5 is a diagram illustrating single carrier communication and multi-carrier communication. Particularly, FIG. 5(a) illustrates a subframe structure of a single carrier, and FIG. 5(b) illustrates a subframe structure of multiple carriers.

Referring to FIG. 5(a), a general wireless communication system performs data transmission or reception through one downlink (DL) band and through one uplink (UL) band corresponding to the DL band (in case of a frequency division duplex (FDD) mode), or divides a predetermined radio frame into a UL time unit and a DL time unit in the time domain and then performs data transmission or reception through the UL/DL time unit (in case of a time division duplex (TDD) mode). Recently, to use a wider frequency band in wireless communication systems, the introduction of carrier aggregation (or bandwidth aggregation) technology that uses a wider UL/DL bandwidth by aggregating a plurality of UL and/or DL frequency blocks has been discussed. Carrier aggregation (CA) is different from an orthogonal frequency division multiplexing (OFDM) system in that DL or UL communication is performed using a plurality of carrier frequencies, whereas the OFDM system carries a basic frequency band divided into a plurality of orthogonal subcarriers on a single carrier frequency to perform DL or UL communication. Hereinafter, each of carriers aggregated by carrier aggregation will be referred to as a component carrier (CC). Referring to FIG. 5(b), three 20 MHz CCs may be aggregated on each of a UL and a DL to support a bandwidth of 60 MHz. The respective CCs may be contiguous or non-contiguous in the frequency domain. For convenience, although FIG. 5(b) illustrates that the bandwidth of UL CC and the bandwidth of DL CC are the same as each other and symmetric to each other, the bandwidth of each CC may be determined independently. Asymmetric carrier aggregation in which the number of UL CCs is different from the number of DL CCs may be implemented. DL/UL CC limited to a specific UE may be referred to as a serving UL/DL CC configured for the specific UE.

Meanwhile, the 3GPP LTE-A standard uses the concept of a cell to manage radio resources. The "cell" associated with the radio resources is defined by combination of DL resources and UL resources, that is, combination of DL CC and UL CC. The cell may be configured by DL resources only, or may be configured by combination of DL resources and UL resources. If carrier aggregation is supported, linkage between a carrier frequency of the DL resources (or DL CC) and a carrier frequency of the UL resources (or UL CC) may be indicated by system information. For example, combination of the DL resources and the UL resources may be indicated by linkage of system information block type 2 (SIB2). In this case, the carrier frequency means a center frequency of each cell or CC. Hereinafter, a cell operating on a primary frequency will be referred to as a primary cell (Pcell) or PCC, and a cell operating on a secondary frequency will be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). The Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

Figure 6:
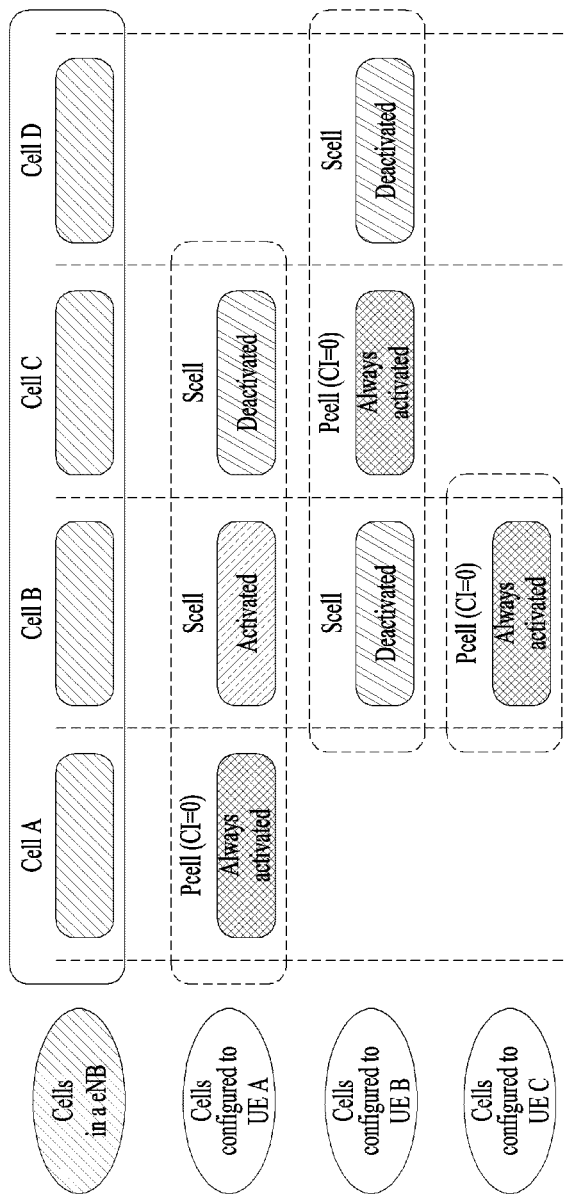
FIG. 6 illustrates the state of cells in a system supporting carrier aggregation (CA).

FIG. 6 illustrates the state of cells in a system supporting carrier aggregation (CA).

In FIG. 6, a configured cell refers to a cell in which CA is performed for a UE based on measurement report from another eNB or UE among cells of an eNB and is configured for each UE. The cell configured for the UE may be a serving cell in terms of the UE. The cell configured for the UE, i.e., the serving cell, pre-reserves resources for ACK/NACK transmission for PDSCH transmission. An activated cell refers to a cell configured to be actually used for PDSCH/PUSCH transmission among cells configured for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and, if a cell is deactivated, CSI reporting and SRS transmission are also stopped in the cell. For reference, in FIG. 6, CI denotes a serving cell index and CI=0 is applied to a Pcell. The serving cell index is a short identity used to identify the serving cell. For example, any one of integers from 0 to "maximum number of carrier frequencies which can be configured for the UE at a time minus 1" may be allocated to one serving cell as the serving cell index. That is, the serving cell index may be a logical index used to identify a specific serving cell among cells allocated to the UE rather than a physical index used to identify a specific carrier frequency among all carrier frequencies.

As mentioned previously, the term cell used in CA is distinguished from the term cell which refers to a prescribed geographical area to which one eNB or one antenna group provides a communication service.

Unless particularly mentioned otherwise, the cell mentioned in the present invention means a cell of CA which is a combination of a UL CC and a DL CC.

Meanwhile, in communication using a single carrier, only one serving cell is present and, therefore, a PDCCH carrying a UL/DL grant and a PUS CH/PDSCH corresponding to the PDCCH are transmitted in the same cell. In other words, in case of FDD in a single carrier situation, a PDCCH for a DL grant for a PDSCH that is to be transmitted on a specific DL CC is transmitted on the specific DL CC and a PDSCH for a UL grant for a PUSCH that is to be transmitted on a specific UL CC is transmitted on a DL CC linked to the specific UL CC.

On the contrary, in a multicarrier system, a plurality of cells may be configured and, therefore, transmission of a UL/DL grant in a serving cell having a good channel state may be permitted. Thus, if a cell carrying the UL/DL grant, which is scheduling information, is different from a cell performing UL/DL transmission corresponding to the UL/DL grant, this is referred to as cross-carrier scheduling.

Hereinafter, scheduling of a cell from the same cell and scheduling of a cell from another cell will be referred to as self-CC scheduling and cross-CC scheduling, respectively.

A 3GPP LTE/LTE-A system may support multicarrier aggregation and cross-carrier scheduling based on multicarrier aggregation, for data transmission rate improvement and stable control signaling.

When cross-carrier scheduling (or cross-CC scheduling) is applied, a PDCCH for DL allocation for a DL CC B or a DL CC C, i.e. a PDCCH carrying a DL grant, may be transmitted on a DL CC A and a PDSCH corresponding to the PDCCH may be transmitted on the DL CC B or the DL CC C. A carrier indicator field (CIF) may be introduced for cross-CC scheduling. Whether the CIF is present in the PDCCH may be indicated semi-statically and UE-specifically (or UE group-specifically) through higher layer signaling (e.g. RRC signaling). The baseline of PDCCH transmission is summarized as follows.

CIF disabled: PDCCH on a DL CC assigns PDSCH resources on the same DL CC or PUSCH resources on a single linked UL CC.
No CIF
Same as LTE PDCCH structure (same coding and same CCE-based resource mapping) and DCI format
CIF enabled: PDCCH on a DL CC can assign PDSCH/PUSCH resources on a specific DL/UL CC among multiple aggregated DL/UL CCs using the CIF.
Extended LTE DCI format with the CIF
CIF (if configured) is a fixed x-bit field (e.g. x=3).
CIF (if configured) location is fixed regardless of DCI format size.

Reuse of an LTE PDCCH structure (same coding and same CCE-based resource mapping)

One or more scheduling CCs may be configured for one UE and one of the scheduling CCs may be a PCC which is in charge of specific DL control signaling and UL PUCCH transmission. A set of the scheduling CCs may be configured UE-specifically, UE-group-specifically, or cell-specifically. The scheduling CC may be configured so as to directly schedule at least itself. That is, the scheduling CC may become a scheduled CC thereof. In the present invention, a CC carrying a PDCCH is referred to as a scheduling CC or a monitoring CC (MCC) and a CC carrying a PDSCH/PUSCH scheduled by the PDCCH is referred to as a scheduled CC.

The scheduling CC includes a DL CC as a part of all aggregated DL CCs. The UE detects/decodes the PDCCH only on corresponding DL CC. In this case, a PDSCH/PUSCH of the scheduling CC or scheduled CC refers to a PDSCH/PUSCH configured/allocated to be transmitted on the corresponding CC and a PHICH of the scheduling CC or scheduled CC refers to a PHICH carrying ACK/NACK for a PUSCH transmitted on the corresponding CC.

As more communication devices demand larger communication capacity, efficient use of a limited frequency band in a future wireless communication system becomes increasingly important. Even in a cellular communication system such as the 3GPP LTE/LTE-A system, a method of using, for traffic offloading, an unlicensed band such as a band of 2.4 GHz used by a legacy Wi-Fi system or an unlicensed band such as a band of 5 GHz, which is newly in the spotlight, is under consideration.

Basically, since the unlicensed band is based on wireless transmission/reception through contention between communication nodes, it is necessary for each communication node to confirm that other communication nodes do not perform signal transmission by performing channel sensing before signal transmission. This procedure is called clear channel assessment (CCA). Even an eNB or a UE of the LTE system needs to perform CCA for signal transmission in the unlicensed band (hereinafter, referred to as an LTE-U band). While the eNB or the UE of the LTE system transmits a signal, other communication nodes such as a Wi-Fi node should not create interference by performing CCA. For example, in Wi-Fi standards (e.g. 801.11ac), a CCA threshold is specified as −62 dBm with respect to a non-Wi-Fi signal and as −82 dBm with respect to a Wi-Fi signal, which means that a station (STA) or an access point (AP) does not perform signal transmission so as not to create interference when a signal other than the Wi-Fi signal is received at a power of −62 dBm or more. Characteristically, in a Wi-Fi system, the STA or the AP may perform CCA and perform signal transmission, unless signals greater than the CCA threshold are detected for 4 μs or more.

Figure 7:
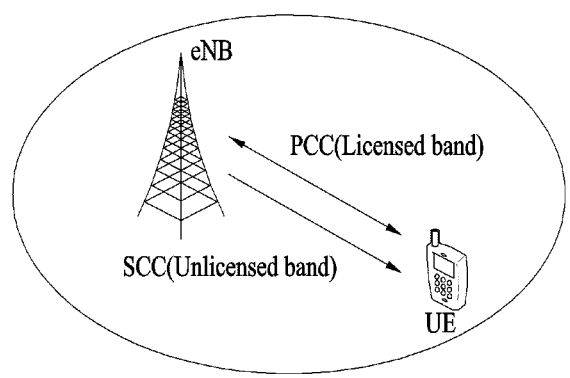
FIG. 7 illustrates a carrier aggregation situation of a 3GPP LTE-A band, which is a licensed band, and an unlicensed band (hereinafter, LTE-U band).

FIG. 7 illustrates a CA situation of a 3GPP LTE-A band, which is a licensed band, and an unlicensed band (hereinafter, LTE-U band).

In the CA situation of the LTE-A band and the LTE-U band, an eNB may transmit a signal to a UE or the UE may transmit a signal to the eNB. In the following description, it is assumed for convenience of description of proposed schemes that the UE is configured to perform wireless communication through two component carriers (CCs) in the LTE-A band and the LTE-U band. As an example, a CC of the LTE-A band may be configured as a PCC and a CC of the LTE-U band may be configured as an SCC. However, the embodiments of the present invention may be extensively applied to a situation in which a plurality of LTE-A bands and a plurality of LTE-U bands are used by a CA scheme or may be applied even when signal transmission/reception between the eNB and the UE is performed only in the LTE-U band. In addition, the embodiments of the present invention may be extensively applied not only to the 3GPP LTE/LTE-A system but also to systems having other characteristics.

Hereinafter, for convenience of description, a cell that is configured in the LTE-A band for 3GPP LTE/LTE-A and operates by a 3GPP LTE/LTE-A scheme will be referred to as an Lcell and a cell that is configured in the LTE-U band operating by an LTE-U scheme and operates by the LTE-U scheme will be referred to as a Ucell.

In order for an eNB and a UE to perform communication in the LTE-U band which is an unlicensed spectrum, the eNB and the UE should occupy/secure the corresponding band for a specific time duration through contention with other communication (e.g. Wi-Fi) systems which are not associated with the LTE/LTE-A system. Hereinafter, the time duration occupied/secured for communication in the LTE-U band will be referred to as a reserved resource period (RRP), for convenience. To secure the RRP, various methods may be used. Typically, there may be a method of transmitting a specific reservation signal so that other communication system devices such as a Wi-Fi device may recognize that a corresponding radio channel is busy or continuously transmitting an RS and/or a data signal so that a signal of a specific power level or more may be seamlessly transmitted during the RRP.

The RRP may be configured by carrier sensing performed by the eNB. If the eNB has determined the RRP during which the eNB desires to occupy the LTE-U band, the eNB may pre-inform the UE of the determined RRP to cause the UE to maintain a communication transmission/reception link during the indicated RRP. As a scheme in which the eNB informs the UE of related RRP information, the eNB may transmit the RRP information to the UE through another CC (e.g. LTE-A band) which is associated in a CA form.

An entity for determining the RRP may differ according to whether transmission is performed on DL or UL. For example, the RRP for DL transmission (hereinafter, DL RRP) may be determined by the eNB based on carrier sensing by the eNB. The RRP for UL transmission (UL RRP) may be determined by the eNB based on carrier sensing by the eNB and may be indicated to the UE. Alternatively, the UE may confirm or determine the UL RRP in units of subframes by checking a channel state prior to signal transmission, i.e. through carrier sensing thereby.

On a cell used for legacy CA, i.e. on an Lcell, an RS for channel synchronization or channel measurement, such as a PSS/SSS/PBCH, a CRS, and/or a CSI-RS, appears periodically and continuously. In contrast, on a Ucell, the eNB may configure the RRP only when the Ucell is in an idle state and transmit the RS for channel measurement in the RRP. Therefore, the RS for synchronization/measurement will appear aperiodically and/or discontinuously on the Ucell.

Meanwhile, on the Lcell, although the UE is configured to detect RS(s) or perform synchronization or measurement using the RS(s) for a time duration during which the Lcell is activated, the RS(s) may be transmitted for a time duration during which the Lcell is inactivated. The synchronization/measurement RS(s) are continuously transmitted regardless of activation or inactivation of the Lcell but the UE is configured to detect the synchronization/measurement RSs only for a time duration during which the Lcell is activated. Unlike this, on the Ucell, the eNB transmits the synchronization or measurement RS(s) only during the RRP and, in principle, does not transmit synchronization or measurement RS(s) during a non-RRP because a wireless communication medium is occupied by other devices during the non-RRP.

As another example of an operation in the LTE-U band which operates by a contention-based random access scheme, the eNB may first perform carrier sensing (CS) before transmitting/receiving data. The eNB may check whether a current channel state of an SCell is busy or idle. If it is determined that the current channel state is idle, the eNB may transmit a scheduling grant through a PDCCH of a PCell (i.e. through cross carrier scheduling) or through a PDCCH of the SCell and attempt to transmit/receive data. In this case, for example, the eNB may configure an RRP including M consecutive subframes (SFs). Here, the eNB may pre-inform the UE of the M value and usage of the M SFs through higher layer signaling (using the PCell) or through a physical control/data channel A start timing of the RRP may be periodically or semi-statically configured through higher layer signaling. Alternatively, if the start timing of the RRP should be set to SF #n, the start timing of the RRP may be designated through physical layer signaling in SF #n or SF #(n-k).

FIG. 8 illustrates a subframe configuration of an RRP.

The RRP may be configured such that boundaries and numbers/indexes of subframe(s) constituting the RRP are aligned with boundaries and numbers/indexes of subframe(s) configured on a Pcell, as illustrated in FIG. 8(a). The RRP configured in such a way is referred to an aligned-RRP.

Alternatively, the RRP may be configured such that the boundaries and numbers/indexes of the subframe(s) constituting the RRP are misaligned with the boundaries and numbers/indexes of the subframe(s) configured on the Pcell, as illustrated in FIG. 8(b). The RRP configured in such a way is referred to as a floating-RRP.

In the embodiments of the present invention, the meaning of "subframe boundaries between cells are aligned with each other" is that that an interval between subframe boundaries of two different cells is less than a specific time, for example, a CP length or X μsec (whereX≥0). In addition, in the embodiments of the present invention, a Pcell may mean a specific cell referred to for determining a boundary of a subframe (and/or symbol) of a Ucell in terms of time (and/or frequency) synchronization.

Data transmission through a cell/carrier (hereinafter, referred to as a cell) configured to operate based on an LTE-U scheme in an unlicensed band, i.e., in a U-band, and scheduling for such data transmission may be basically performed based on CCA through carrier sensing due to characteristics of the U-band. For UL data transmission through an LTE-U based cell (hereinafter, Ucell) and scheduling for such UL data transmission, it may be desirable that a UE, which is a signal transmission entity, perform CCA for the Ucell.

One scheduling scheme (hereinafter, a first UL scheduling scheme) that can be considered in terms of performing CCA for the Ucell by the UE for UL signal transmission is that, if an eNB transmits a UL grant to the UE at a specific timing, the UE performs CCA for the Ucell at a timing after a predetermined time and performs UL data transmission or omits UL data transmission according to a result of performing CCA. For example, according to the first UL scheduling scheme, if the eNB transmits the UL grant through a cell in a stable licensed band (for convenience, referred to as an Lcell), the UE performs CCA for the Ucell after a predetermined time from the timing when the UL grant is received. As a result of CCA, if it is determined that a radio channel state of the Ucell is idle, the UE may transmit UL data and, if it is determined that the radio channel state of the Ucell is busy, the UE may omit transmission of the UL data. The first UL scheduling scheme is simple in operation and can uniformly maintain a latency from a UL grant timing to a data transmission timing, i.e., a grant-to-data latency, whereas the first UL scheduling scheme may increase control signaling (e.g., UL grant) overhead when CCA is failure, i.e., when the Ucell is determined to be busy, because the first UL scheduling scheme depends only on the result of CCA at a specific timing.

Another UL scheduling scheme (hereinafter, a second UL scheduling scheme) that can be additionally considered is that, if the eNB transmits the UL grant to the UE at a specific timing in a similar way to the first UL scheduling scheme, the UE performs CCA during a predetermined time duration starting from a proper timing after transmitting the UL grant. According to the second UL scheduling scheme, the UE performs UL data transmission at a timing at which it is determined that the Ucell is idle and omits UL data transmission when it is determined that the Ucell continues to be busy during a corresponding time duration. In the second UL scheduling scheme, the UL grant may be effective/useful for a relatively long time, whereas a grant-to-data latency may not be uniform due to an aperiodic Ucell state (e.g., idle or busy) and an (aperiodic) CCA success timing according to the aperiodic Ucell state and link adaptation performance such as MCS level determination may deteriorate as a CCA duration increases in consideration of control signaling overhead.

The present invention proposes a UL scheduling method considering control overhead and scheduling latency which are shortcomings of the first and second UL scheduling schemes, in order to support efficient UL scheduling.

Figure 9:
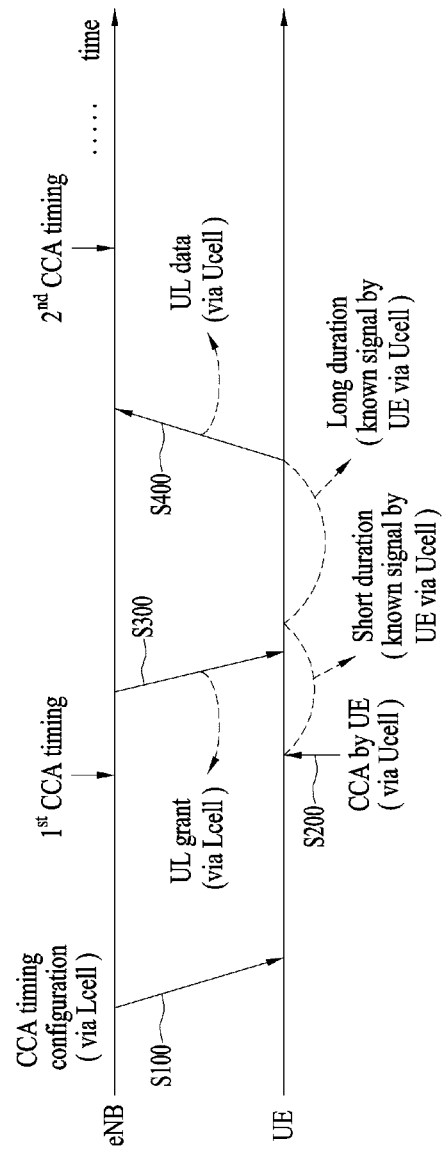
FIG. 9 illustrates UL signal transmission according to an embodiment of the present invention.

FIG. 9 illustrates UL signal transmission according to an embodiment of the present invention.

The UL scheduling method according to the present invention may be configured/applied broadly as four sequential steps. A detailed operation of each step of the UL scheduling method according to the present invention will now be described with reference to FIG. 9. Hereinafter, for convenience of description, it is assumed that the Ucell is basically configured to be cross-CC scheduled from a specific Lcell.

Step 0: The eNB Preconfigures Timing and Period for CCA (S100).

The eNB preconfigures, for a UE, information about a timing for performing CCA for the Ucell, e.g., a CCA timing and/or period.

The eNB may configure the CCA timing and/or period according to Wi-Fi standard or in consideration of Wi-Fi standard.

Step 1: The UE Performs CCA and Transmits a Known Signal (S200).

The UE performs a CCA operation for the Ucell at the preconfigured CCA timing and/or period (hereinafter, timing/period).

Upon succeeding in performing CCA, the UE may transmit a preconfigured known signal on the Ucell during a preconfigured short duration (e.g., 1 ms or one subframe). On the other hand, upon failing to perform CCA, the UE may wait until the next CCA timing (without performing an additional operation).

The short duration is a time necessary for the eNB transmits a UL grant to the UE through the Lcell. The short duration may be predetermined between the eNB and the UE or the eNB may configure the short duration for the UE, in consideration of a time needed until the UE receives the UL grant after succeeding in performing CCA and then transmitting the known signal. The UE should be accurately aware of the short duration in order to prevent collision with other UEs. Accordingly, in embodiments of the present invention, it is assumed that the short duration is transparent with respect to the UE and the eNB (regardless of a detailed CCA configuration or regardless of whether the UE has succeeded in performing CCA).

In performing CCA, the UE may perform a CCA operation for the Ucell at all configured CCA timings. For example, the UE may perform CCA for the Ucell at every configured CCA timing irrespective of whether UL scheduling is demanded, i.e., whether a UL data transmission resource is demanded. Alternatively, the UE may selectively perform the CCA operation only at specific partial CCA timings among the configured CCA timings. For example, the UE may selectively perform the CCA operation at specific partial CCA timings according to whether UL scheduling is demanded.

Herein, the known signal may be a signal defined during implementation of the eNB and the UE or a predetermined signal through a communication process between the eNB and the UE so as to be recognized as a signal indicating success of CCA. A legacy UL signal may be defined as the known signal or a new UL signal may be defined as the known signal. Any signal that can be recognized by the eNB and the UE as a signal indicating success of CCA may be used as the known signal regardless of the type and/or form of the signal. For example, the known signal may be configured in the form of a signal having a short time duration and a frequency/time resource and/or a code/sequence parameter for configuring the known signal may be configured for the UE in consideration of multiplexing between known signals of different UEs. For example, an SRS (sequence) or a DMRS (sequence) used for a PUSCH/PUCCH may be used as the signal having the short time duration. The parameter considering multiplexing between known signals of different UEs may include, for example, an RB index, a symbol index, a cyclic shift, or a transmission comb.

Step 2: The eNB Detects a Known Signal of the UE and Transmits a UL Grant (S300)

The eNB attempts to detect the known signal transmitted by the UE in the afore-mentioned short duration (on the Ucell).

Upon succeeding in detecting the known signal, the eNB may transmit the UL grant to the UE through a corresponding short duration (on an Lcell). Meanwhile, upon failing to detect the known signal, the eNB may wait until the next CCA timing (without any additional operation).

Step 3: The UE Detects the UL Grant and Performs UL Data Transmission (S400)

The UE (that has transmitted the known signal) attempts to detect the UL grant transmitted from the eNB (on the Lcell) through the short duration.

Upon succeeding in detecting the UL grant, the UE may perform UL data transmission (corresponding to the UL grant) after additionally transmitting a preconfigured known signal (for the purpose of occupying a radio channel of the Ucell before UL data transmission) (on the Ucell) during a preconfigured long duration (e.g., 3 ms or 3 subframes or 4 ms or 4 subframes) (after the short duration). On the other hand, upon failing to detect the UL grant, the UE may stop performing signal transmission and wait until the next CCA timing (without an additional operation).

The long duration may be determined in consideration of a time needed to process corresponding UL data to be transmitted by the UE that has received the UL grant. For example, the long duration may be predefined between the eNB and the UE or the eNB may configure the long duration for the UE.

For reference, in order to distinguish between the known signal transmitted in the short duration to indicate success of CCA and the known signal transmitted in the long duration which will be described later, the known signal transmitted in the short duration will be referred to as a first known signal and the known signal transmitted in the long duration will be referred to as a second known signal. Both the first known signal and the second known signal may be used as signals indicating that the UE occupies the Ucell.

Since the transmission of the second known signal during the long duration is based on the premise that the UE has received the UL grant, the UE that has not received the UL grant does not use the long duration after the short duration is ended. If the UE does not transmit the second known signal during the long duration, a Ucell resource of the long duration may be used by other UEs.

In the above-described UL scheduling method of the present invention, when the Lcell configured to cross-CC schedule the Ucell operates based on a TDD scheme, the short duration and/or the CCA timing may be configured in consideration of a DL duration or timing (hereinafter, a DL duration/timing) (during or at which UL grant transmission can be performed) on the Lcell. For example, the short duration may be configured to overlap with a specific DL duration starting from a duration (immediately) before the specific DL duration of the Lcell and the CCA timing may be configured to be located at a timing immediately prior to the short duration. If the short duration and/or the CCA timing is configured in consideration of the DL duration/timing on the Lcell operating based on the TDD scheme, this may be efficient in terms of reducing the transmission duration (i.e., the short duration and/or the long duration) of the known signal (for the purpose of occupying the Ucell).

Additionally, according to the state or situation of the UE, it is possible to perform CCA and adjust frequency/probability of transmission of the known signal based on CCA. For example, 1) in a state in which one CCA timing set having a specific cycle is configured, a timing interval/cycle that the UE selects to actually perform CCA (or known signal transmission) within the CCA timing set, or 2) in a state in which a plurality of CCA timing sets having different cycles are configured, a CCA timing set or a CCA timing cycle that the UE selects to actually perform CCA (and known signal transmission) among the plural CCA timing sets may be determined according to the state of a UL buffer or may be determined depending on whether CCA (and/or UL grant detection) is successful.

For example, when many UL resources are demanded for UL data transmission, a timing (set) of a small interval/cycle may be selected or, when the UE fails to perform CCA (and/or detect the UL grant), a timing (set) of a small interval/cycle may be selected.

Meanwhile, in the UL scheduling method of the present invention, in the case of UL CCA, a proper CCA timing may be selected/used according to whether the UE requires CCA (e.g., whether UL scheduling is demanded) without the need to configure an additional timing/period by the eNB as in Step 0. In Step 0, one CCA timing configured by the eNB may be configured in units of CCA time durations during which one or multiple CCA operations are permitted. For example, a CCA timing of 1 ms may be configured to occur at a cycle of 5 ms or multiple CCA operations may be permitted within the CCA timing of 1 ms. In addition, in Step 1, the UE may perform one or more CCA operations during the short duration until the UE succeeds in performing CCA, i.e., until the UE successfully occupies a Ucell radio channel. In Step 1, the UE may transmit the first known signal on the Ucell through the short duration and simultaneously transmit a signal indicating that CCA has been successfully performed to the eNB on the Lcell. If the UE simultaneously transmits the first known signal on the Ucell and the signal indicating that CCA has been successfully performed on the Lcell during the short duration, the eNB is informed that an idle channel has been acquired even before the eNB detects the first known signal on the Ucell or even though the eNB fails to detect the first known signal. In this case, the Ucell is obviously occupied by the UE but this means that only a channel state of the Ucell is not good. Therefore, the eNB can advantageously provide a UL grant having an improved MCS or transmission power to the UE. In Step 1, the UE may transmit the known signal (through the short duration) at a timing/period configured by the eNB without performing an additional CCA operation. For example, a plurality of UEs may contend to occupy the Ucell by transmitting known signals at a timing/period configured by the eNB and the eNB may perform UL scheduling by selecting a specific UE from among the plural UEs that contend with each other.

Meanwhile, the UE may be notified of the UL grant before the UE informs the eNB that the Ucell is occupied by the UE. Hereinafter, the UL grant indicated to the UE before the UE occupies the Ucell will be referred to as a pre-grant. In a state in which the UE pre-receives the pre-grant from the eNB, if the UE receives the UL grant of Step 2, the UL grant of Step 2 may be replaced with a confirmation signal for the pre-grant or the confirmation signal for the pre-grant may be used for the UL grant of Step 2. For example, the UL grant of Step 2 may be used as a signal permitting UL data transmission according to the pre-grant.

In Step 3, the known signal transmitted through the long duration, i.e., the second known signal, may have a structure which is the same as or different from the known signal transmitted through the short duration, i.e., the first known signal. For example, the first known signal and the second known signal may be configured to have the same or different time duration(s), resources, signal generation parameter(s). In Step 2 or Step 3, the UL grant may schedule UL data in one subframe (after the long duration) or UL data to be transmitted in a plurality of subframes. For example, the UL grant of Step 2 or Step 3 may allocate a UL transmission resource to be applied to one subframe, a UL transmission resource to be commonly applied to a plurality of subframes, or a UL transmission resource to be applied to each of a plurality of subframes.

In addition, a frequency resource region for UL data transmission may be configured to be identical to a transmission resource region of the known signal (through the short or long duration). In this case, information about resource allocation for UL data transmission may be omitted in the UL grant of Step 2 or Step 3.

The UL scheduling method of the present invention may be extended to a scheme in which the UE directly selects a UL data transmission resource (hereinafter, referred to as "UE selection based UL scheduling method"). Specifically, in Step 0, the eNB may preconfigure, for the UE, a UL resource (e.g., RB or RB group) candidate set that the UE can select for UL data transmission. The UL resource candidate set may be independently (differently) configured per CCA timing. Next, in Step 1, the UE may check a UL data buffer state thereof to select a proper UL resource in the UL resource candidate set and perform a CCA operation through a proper CCA timing and known signal transmission based on the CCA operation. In this case, a (distinguishable) known signal corresponding to each UL resource may be preconfigured or selected UL resource information may be directly signaled through the known signal. Next, in Step 2, the eNB may detect and identify the known signal from the UE to transmit a confirmation signal only to a target UE that is allowed to perform UL data transmission. Finally, in Step 3, the UE may perform or omit UL data transmission through a UL resource selected thereby according to whether the confirmation signal transmitted by the eNB is detected. Meanwhile, when the UE selection based UL scheduling method is applied to a specific situation, for example, a UL data transmission situation through an Lcell, the CCA operation in Step 1 may be omitted and then, in Step 0, a known signal transmission timing (rather than a CCA timing) may be configured.

Meanwhile, in the UL selection based UL scheduling method, in the case of other UL grant DCI (e.g., MCS, transport block size (TBS), RV, NDI, DMRS cyclic shift, TPC command, etc.) except for a UL resource (e.g., RB or RB group), Alt 1) the eNB may preconfigure the DCI corresponding to each UL resource in the UL resource candidate set, Alt 2) the UE may determine the DCI and signal the determined DCI to the eNB through the known signal, Alt 3) the eNB may determine the DCI and signal the determined DCI to the UE through the confirmation signal, or Alt 4) the UE may determine the DCI and transmit the determined DCI in a multiplexed form with UL data.

For reference, in Alt 4, the eNB should be aware of the contents of the DCI to receive the UL data. Accordingly, upon multiplexing the DCI except for UL resource information with the UL data and transmitting the multiplexed DCI, a resource to which the DCI is (multiplexed and) mapped/transmitted in a UL resource used for UL data transmission and an MCS applied to DCI transmission are preconfigured in order to cause the eNB to acquire the DCI.

Alt 1, Alt 2, Alt 3, and Alt 4 may be applied alone or in combination thereof. As an example of the latter, an MCS and a TBS (and/or a DMRS cyclic shift) may be configured through Alt 1, Alt 2, and Alt 4 and an RV/NDI and a TPC command (and/or a DMRS cyclic shift) may be configured through Alt 3.

In the above-described UL scheduling methods of the present invention, in the case of the long duration, known signal transmission performed by the UE may be omitted. In this case, a duration during which the UE attempts to detect the confirmation signal transmitted by the eNB may be configured to be the short duration and/or (all or (first) part of) the long duration. In the above-described UL scheduling methods (especially, the pre-grant or UE selection based UL scheduling method) of the present invention, UL data transmission may be modified to be started immediately after the short duration (without an additional long duration) or to be started from a specific timing in the short duration. In the latter case, the short duration (designated as a duration during which the UE attempts to detect the confirmation signal transmitted by the eNB) may be configured to be a duration including transmission of (first) part of UL data after known signal transmission. Meanwhile, in the UL scheduling methods (especially, the UE selection based UL scheduling method), the confirmation signal transmitted by the eNB may be configured/transmitted in the form of including a specific parameter (e.g., UE ID (e.g., C-RNTI), a DMRS sequence, or a DMRS cyclic shift) for distinguishing between UEs or may be configured/transmitted to become different according to a known signal transmitted by the UE or a UL resource selected by the UE.

CA according to an embodiment of the present invention may not be limitedly applied only to a cell (e.g., Ucell) operating based on an aperiodic RRP such as an LTE-U band and may be similarly applied to a normal cell (e.g., Lcell) operating based on a transmission resource configuration as in legacy LTE.

Figure 10:
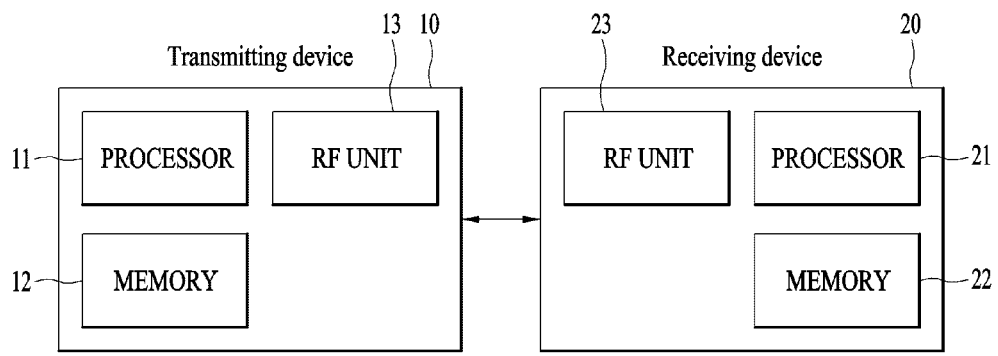
FIG. 10 is a block diagram illustrating elements of a transmitting device 10 and a receiving device 20 for implementing the present invention.

FIG. 10 is a block diagram illustrating elements of a transmitting device 10 and a receiving device 20 for implementing the present invention.

The transmitting device 10 and the receiving device 20 respectively include radio frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs), which are configured to perform the present invention, may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer equal to or greater than 1) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be derived from a channel carrying another symbol of the same antenna. An RF unit supporting a multiple input multiple output (MIMO) function of transmitting and receiving data using a plurality of antennas may be connected to two or more antennas.

In the embodiments of the present invention, a UE operates as the transmitting device 10 on UL and as the receiving device 20 on DL. In the embodiments of the present invention, an eNB operates as the receiving device 20 on UL and as the transmitting device 10 on DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may control the eNB RF unit to transmit CCA configuration information, a pre-grant, and/or UL resource candidate set information according to at least one of the UL scheduling method, the pre-grant based UL scheduling method, and the UE selection based UL scheduling method. The UE processor may control the UE RF unit to receive the CCA configuration information, the pre-grant, and/or the UL resource candidate set information according to a corresponding UL scheduling method. The CCA configuration information, the pre-grant, and/or the UL resource candidate set information may be transmitted or received through an Lcell configured in a licensed band.

The UE processor may perform CCA for a Ucell according to at least one of the UL scheduling method, the pre-grant based UL scheduling method, and the UE selection based UL scheduling method and transmit a known signal through the Ucell according to whether CCA is successful or wait for the next CCA timing. The UE processor may control the UE RF unit to transmit the known signal through the Ucell during a preconfigured short duration.

The eNB processor may attempt to detect the known signal on the Ucell during the preconfigured short duration. The eNB processor may control the eNB RF unit to transmit a UL grant for the Ucell to the UE that has transmitted the known signal only upon detecting the known signal on the Ucell during the short duration. The UL grant for the Ucell may be transmitted through the Lcell. Upon not detecting the known signal, the eNB processor may not allocate a UL resource to the UE.

The UE processor may control the UE RF unit to attempt to receive the UL grant for the Ucell on the Lcell during the short duration. Upon not receiving the UL grant during the short duration, the UE processor may wait until the next CCA timing and repeat Step 1 to Step 3 at the next CCA timing according to the scheduling method, the pre-grant based UL scheduling method, or the UE selection based UL scheduling method. Upon receiving the UL grant during the short duration, the UE processor may control the UR RF unit to transmit UL data according to the UL grant at a timing after a preconfigured long duration. The UE processor may control the UE RF unit to transmit the known signal to continue to occupy the Ucell during the long duration.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other devices in a wireless communication system.

The invention claimed is:

1. A method of transmitting uplink data by a user equipment (UE), the method comprising:
performing clear carrier assessment (CCA) for a second cell configured in an unlicensed band;
transmitting a first occupation signal through the second cell during a first predetermined time duration, when the performing of the CCA for the second cell is successful, otherwise, when the performing of the CCA for the second cell has failed, waiting until a next CCA timing;
attempting to detect an uplink grant for the second cell, which is a response signal for the first occupation signal, on a first cell configured in a licensed band during the first predetermined time duration; and
transmitting the uplink data through the second cell according to the uplink grant for the second cell, when detecting the uplink grant for the second cell on the first cell, otherwise, when the uplink grant for the second cell is not detected, waiting until the next CCA timing.

2. The method according to claim 1, further comprising:
receiving configuration information for the CCA for the second cell through the first cell; and
performing the CCA for the second cell according to the configuration information.

3. The method according to claim 1, wherein the transmitting the uplink data includes transmitting the uplink data after a second predetermined time duration from a time at which the uplink grant for the second cell is detected.

4. The method according to claim 3, further comprising transmitting a second occupation signal during the second predetermined time duration.

5. A method of receiving uplink data by a base station (BS) from a user equipment (UE), the method comprising:
receiving a first occupation signal, indicating that clear carrier assessment (CCA) for a second cell by the UE is successful, from the UE through the second cell configured in an unlicensed band within a first predetermined time duration, otherwise, when the CCA for the second cell by the UE has failed, waiting until receiving the first occupation signal;
transmitting an uplink grant for the second cell, which is a response signal for the first occupation signal, to the UE on a first cell configured in a licensed band within the first preconfigured time duration; and
attempting to receive the uplink data on the second cell according to the uplink grant for the second cell.

6. The method according to claim 5, wherein the receiving the uplink data includes attempting to receive the uplink data for a second preconfigured time duration after transmitting the uplink grant for the second cell.

7. The method according to claim 5, further comprising transmitting configuration information for the CCA for the second cell through the first cell.

8. A user equipment (UE) for transmitting uplink data, the UE comprising:
a transceiver; and
a processor configured to control the transceiver,
wherein the processor is configured to:
perform clear carrier assessment (CCA) for a second cell configured in an unlicensed band,
control the transceiver to transmit a first occupation signal through the second cell during a first predetermined time duration, when the performing of the CCA for the second cell is successful, otherwise, when the performing of the CCA for the second cell has failed, wait until a next CCA timing,
attempt to detect an uplink grant for the second cell, which is a response signal for the first occupation signal, on a first cell configured in a licensed band during the first predetermined time duration, and
control the transceiver to transmit the uplink data through the second cell according to the uplink grant for the second cell, when detecting the uplink grant for the second cell on the first cell, otherwise, when the uplink grant for the second cell is not detected on the first cell, wait until the next CCA timing.

9. The UE according to claim 8, wherein the processor is configured to:
control the transceiver to receive configuration information for the CCA for the second cell through the first cell, and
perform the CCA for the second cell according to the configuration information.

10. The UE according to claim 8, wherein the uplink data is transmitted after a second predetermined time duration from a time at which the uplink grant for the second cell is detected.

11. The UE according to claim 10, wherein a second occupation signal is transmitted during the second predetermined time duration.

* * * * *